United States Patent
Bardot

[15] 3,660,908
[45] May 9, 1972

[54] PROCESS AND APPARATUS FOR DRYING MICRO-ORGANISMS, IN PARTICULAR EDIBLE YEASTS

[72] Inventor: Paul Bardot, Paris, France

[73] Assignee: Societe Pour L'Equipement Des Industries Chimiques Speichim, Paris, France

[22] Filed: Sept. 15, 1970

[21] Appl. No.: 72,334

[30] Foreign Application Priority Data

Sept. 15, 1969 France..............................6931305

[52] U.S. Cl.................................................34/8, 34/10
[51] Int. Cl....................................................F26b 5/08
[58] Field of Search..................34/8, 10, 12, 57 A, 57 C

[56] References Cited

UNITED STATES PATENTS 2,677,608  5/1954  McKay et al..............................34/10

Primary Examiner—John J. Camby
Attorney—Stevens, Davis, Miller & Mosher

[57] ABSTRACT

An aqueous suspension obtained by culturing a micro-organism, especially a fodder or edible yeast, is treated to give a dried product by concentrating it as by filtration, bringing it to a solids content at which it can be pelleted, forming it into pellets, and drying the pellets by a fluidized bed technique at a temperature of 50° to 400° C. The solids content of the concentrate can be further increased as required by a pre-drying step at a temperature of 50° to 400° C., or preferably by recycling and mixing with it part of the dried material.

15 Claims, 1 Drawing Figure

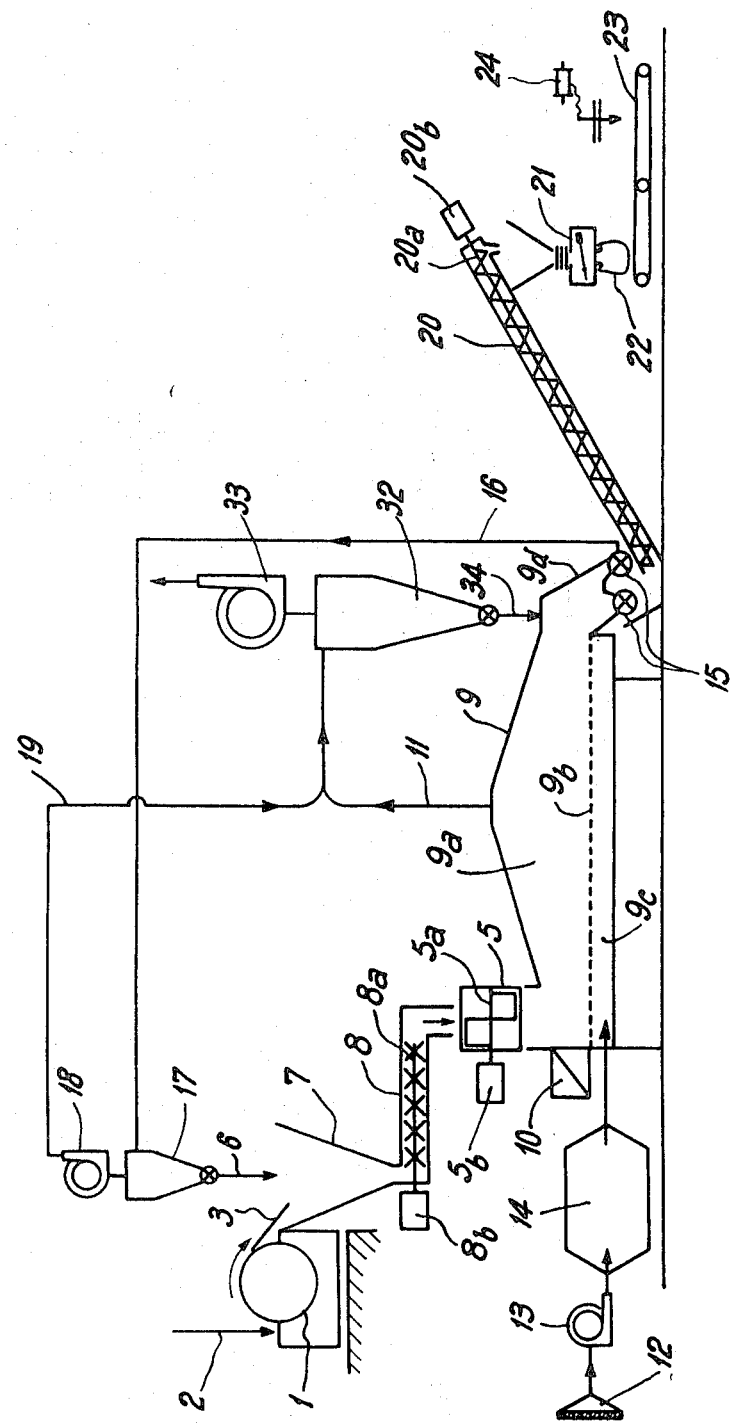

PROCESS AND APPARATUS FOR DRYING MICRO-ORGANISMS, IN PARTICULAR EDIBLE YEASTS

The present invention relates to the drying of cultured micro-organisms, in particular edible yeasts, which are available in the form of an aqueous suspension of creamy consistency having a solids content which is most commonly of the order of 13 to 15 percent by weight, though it can reach about 18 percent.

It is known that the cells of yeast are rich in proteins and also in so-called "essential" amino-acids, that is to say in amino-acids which the primary organism is not capable of synthesizing. The edible yeasts are generally considered to be the best sources of proteins which allow the formulations of foodstuffs intended for human and animal consumption to be corrected.

For a yeast to be an excellent component of a foodstuff ration it is necessary for its proteins to be digestible. However, the still living cells are protected by a cellulosic envelope or membrane which the intestinal juices cannot attack and which must be hydrolysed to render the yeast digestible.

The digestibility is measured by the pepsin method, which allows the proportion of digestible protein contained in the yeast to be defined; in order to hydrolyze the cellulosic membrane of the cell at least partially, a heat treatment either preceding or following concentration is generally used.

It has already been proposed to dry the yeast either on rolls or by spraying after concentration.

Drying on rolls is applicable to small-scale production, generally less than 10 tons of solids per day, or about 500 kg of yeast powder per hour. The cream is passed into a steam-fed roll drier, which dries it in the form of a film which is detached from the roll by means of a doctor blade. In this process, the yeast is thermolyzed when it comes into actual contact with the roll, at the same time as it is dried.

In the processes which involve spray drying and are suitable for the largest-scale production, concentration by evaporation has been proposed. In this case, the yeast cream of for example about 15 percent solids content issuing from the centrifuge separator passes through various heaters operated by the action of the concentrator, and is heated in these. It thereafter passes into a pasteurizer or thermolizer and it is then directed onto the bundles of tubes of the concentration apparatus, where it is concentrated by evaporation in vacuo.

The product which leaves the concentrator generally contains from 22 to 23 percent of solids. At this degree of concentration, the thermolyzed cream is relatively liquid. This cream is thereafter dehydrated in a spray drying apparatus.

Instead of using evaporation before spraying, it has also been proposed to achieve concentration by a filtration step. In this case, the cream containing for example 15 percent of solids is charged onto a continuous rotating filter, which produces a "cake" or a paste containing about 25 to 27 percent of solids. This paste passes through a heating apparatus which raises it to 80°–85° C over the course of about 5 minutes, while rendering it fluid and hence capable of being pumped.

The yeast which has thus been rendered liquid is spray-dried. Spray-drying generally demands very costly installations of very large dimensions.

The present invention is designed to give a very digestible yeast, in particular a yeast capable of being digested to about 80 to 90 percent by pepsin, in large amounts, at reduced cost and with better yield than has been general heretofore.

The invention is applicable generally to the treatment of any micro-organism cultured for industrial purposes, in particular for foodstuff purposes, but more especially to edible yeasts (including fodder yeasts), regardless of how the cells are cultured, e.g. on distiller's wash, cane sugar molasses or sugar beet molasses, milk serum or petroleum products. For this reason, and for convenience of presentation, specific reference will be made to yeast, but it must be understood that the invention is not limited thereto.

In one aspect the invention consists in a process for drying a culture of a micro-organism obtained as an aqueous suspension, which comprises concentrating the suspension and bringing it to a solids content at which it can be formed into granules or pellets, forming it into granules or pellets, and drying the granules or pellets by a fluidization technique.

Preferably the initial concentration is effected by filtration using a rotary filter, but other devices, e.g. a filter press or a centrifuge, can be used if desired.

To bring the material to a solids content at which it can be formed into granules or pellets (hereinafter termed the "pelleting point") it is usually preferable to add to the immediate product of the concentration step (hereinafter referred to as "filter cake") a suitable proportion of a dried product similar thereto but of higher solids content. Most advantageously this added material is recycled dried product.

The pelleting point will vary with the particular micro-organism being treated. Thus among the yeasts the pelleting point for the Saccharomyces is 28 – 30 percent, for the Candidas is 35 – 38 percent, and for the Torulas is 56 – 57 percent. For convenience and for safety it is usually preferable to bring the solids content to at least a little above the pelleting point for the micro-organism in question. If the pelleting point is not reached, the product is more or less tacky or gelatinous, and cannot usefully be converted into coherent granules or pellets on conventional pelleting machinery.

It is also possible to raise the solids content of the filter cake by giving it a pre-drying treatment, whether or not a proportion of dried material is also added. However, drying at this stage presents certain technical difficulties, largely because water has to be removed from within the cells (intra-cellular water) as well as from between cells (interstitial water), and living and killed cells differ in the ease with which they give up water, and in any case are not in the same physical condition for handling.

For a pre-drying operation without addition of dried material, it is desirable to divide the filter cake into fragments or crumbs, for example by passing it under a rotating spindle provided with teeth, and to treat the fragments at a temperature and for a time which are sufficient for the pelleting point to be at least reached and preferably exceeded, and also for the cells to be killed without damage to the essential amino acids, in particular lysine, whose content in soybean flour is relatively low.

Suitable temperatures for pre-drying are within the range 50° – 400° C. For each temperature within this range one can readily determine by experiment the minimum drying period required to reach the pelleting point for the micro-organism in question. Thus, heating the filter cake to 80° – 85° C. for a few minutes as previously proposed removes hardly any water and would be quite insufficient, and as a rule pre-drying at such a temperature requires about ½ to 1 hour. If the pre-drying is to be supplemented by the addition of dried material, shorter drying times or lower temperatures within the said range can naturally be used.

The pre-drying can be effected by a static or fluidized bed technique, while in another method the fragments or crumbs of filter cake are transferred to a perforated conveyor belt which moves, during the required pre-drying time, through a tunnel swept by a gas stream at the selected temperature.

The gas in which the granules or pellets are suspended during the fluidisation drying can be air, depleted in oxygen if circumstances demand it, or an inert gas such as nitrogen, and this gas can be introduced into the fluidization zone at a temperature of 50° to 400° C. A temperature of the order of 150° C., say 135° to 165° C., is satisfactory in all respects.

The invention comprises also an apparatus suitable for carrying out the process described above, which comprises in combination a yeast filter, a device for forming the filter cake into granules or pellets, a device for drying said granules or pellets by fluidization, and means for feeding the said granules or pellets thereto. Optionally it comprises also means for recycling part of the material which has left the drying means to the filter cake before it is formed into granules or pellets.

The invention will now be described, by way of example only, with reference to the accompanying drawing, which is a schematic representation of an apparatus in accordance with the invention.

Referring now to the drawing, the apparatus comprises a continuous rotating filter 1 which at 2 receives a yeast cream of about 15 percent solids content. The web of concentrated yeast paste which leaves the filter is passed by means of an inclined surface 3 to a continuous granulator 5, of which the rotor and the drive motor are schematically shown at 5a and 5b respectively. As will be seen later, the paste is preferably intimately mixed with some drier yeast powder delivered at 6 and in this case, as the drawing shows, it is then diverted into a feed hopper 7 which ends at the inlet of a continuous mixer 8, comprising a mixing rotor 8a and drive motor 8b.

The granulator 5 is so mounted that the material issuing from it enters a device for drying fluidization, designated overall by 9, and comprising a suspension chamber 9a above a perforated vibrating table 9b, a chamber 9c for the introduction of hot gas under this table, and an outlet 9d, for dry yeast powder. The table 9b is operatively connected to vibrator 10.

In this example, the hot gas is air drawn from the atmosphere through a filter 11 and forced by means of a fan 13 across a heater 14 and into the chamber 9c, from where it rises across the perforated table 9b.

The hot air which has flowed turbulently in the chamber 9a and has there dried the yeast particles while killing its cells, carries the finest of these particles through a pipe line 11 to a cyclone 32 surmounted by a suction fan 33. From the bottom of the cyclone, a pipe line 34 passes the dry particles which have been separated off to the outlet 9d, where rotating sluices 15 for removing the main mass of the dry product are also provided.

In a preferred embodiment, a pipe line 16 starts from the outlet 9d and ends in a separator for solids, such as a cyclone 17 combined with a suction fan 18, the solid material from the cyclone being passed at 6 into the hopper 7. A pipe line 19 leads the gas from the fan 18 back to the cyclone 32.

As shown, the apparatus can be completed by an elevator conveyor 20, for example of the screw type (screw 20a and driving motor 20b), a semi-automatic balance 21 for weighing and sack-filling (sack 22), a conveyor belt 23 for the sacks, and a machine 24 for sewing up the sacks.

In this apparatus all the constituent parts can be of conventional design, and do not require further description. The rotating filter 1 can, if desired, be replaced by a filter press or a centrifuge.

The recycled dry yeast powder which is delivered at 6 will normally be introduced in such proportions relative to the paste coming from the filter that the mixture has a solids content of over 27 percent, the precise value varying with the micro-organism involved as already described. The temperature and the flow of air through the chamber 9a can be so adjusted that the granules coming from the apparatus 5 are rapidly raised to a temperature of about 80° C., at which the live cells are killed.

On issuing from the drying apparatus the granules will typically have a moisture content of about 4 percent, and can be packaged as such or ground to give a finer powder.

The installation described offers various advantages.

As in the known process using filtration followed by spray-drying, the amount of water removed by filtration exceeds that removed by evaporation, but the fluidization drying requires considerably less heat than spray-drying; for example, if steam heating is used, a low pressure boiler (less than 6 kg/cm²) can be substituted for a medium pressure boiler (10 kg/cm²).

The continuous enrichment of the paste issuing from the filter with recycled dry material is easily controlled so as to bring the material as a whole to a moisture content, and hence to a plasticity, which is suitable for good granulation or pelleting.

The heat yield of the drying process with air at 150° C., for example, generally exceeds 60 percent, though it is necessary to reach a temperature of 400° C. for a similar yield in spray-drying. This is important, since the spontaneous ignition point of yeast powder is about 400° C.

Loss due to entrainment of dried material in the moist air issuing from the drying apparatus is considerably reduced, because the fines originating from compacted granules do not exceed 5 percent by weight of the dry product and have a size between 80 and 200 microns, making it possible to use cyclones of large diameter, which are less expensive than the cyclones for spray-dried yeast powders; in this latter case, cyclones of small diameter are required because the average size of the fine powder particles passing through them is between 10 and 60 microns.

For withdrawing the same amount of water from the yeast cream so as to bring it to the pulverulent stage, an installation for drying by fluidization costs very significantly less than an installation for spray-drying, usually 30 to 50 percent less, depending on the particular case.

The running cost also is less because:

a. At equal heat yield, drying by fluidization will require calories at a low temperature (e.g. about 150° C.), instead of at 400° C., as is in spray-drying.

b. The loss of powder carried away in the moist drying air is practically negligible, and c. There is less water to remove in drying in the filtration process than in the evaporation process (70 percent of water to be removed by the first process, as against 78 to 80 percent in the second).

Typical micro-organisms to which the invention can be applied include *Torula utilis* and *T.famata*, Rhodotorula sp., Torulopsis sp. and *T.utilis*, *Candida lipolytica*, *C.tropicalis*, *C. rugosa*, C.sp., *C. guillermondii*, *C. robusta*, *C. pelliculosa*, *C. intermedia* and *C. arborea*, *Trichonospore cutaneum*, *Trichosporum capitanicum*, *Endomyces vernalis*, *Bacillus paraffinicus*, *Methanomonas*, *Pseudomonas* species and *Micrococcus cerificans*, as well as Aspergillii and Penicillia.

I claim:

1. Process for drying a culture of a micro-organism obtained as an aqueous suspension, which comprises concentrating the suspension and bringing it to a solids content at which it can be formed into granules or pellets, forming it into granules or pellets, and drying the granules or pellets by fluidization technique.

2. Process according to claim 1, in which the initial aqueous suspension is concentrated by filtration or centrifuging.

3. Process according to claim 2, in which the micro-organism is a fodder or edible yeast.

4. Process according to claim 3, in which the micro-organism is a saccharomyces yeast and the product obtained by the concentration is brought to a solids content of 28–30 percent or higher before it is formed into granules or pellets.

5. Process according to claim 3, in which the micro-organism is a Candida yeast, and the product obtained by the concentration is brought to a solids content of 35–38 percent or higher before it is formed into granules or pellets.

6. Process according to claim 3, in which the micro-organism is a Torula yeast, and the product obtained by the concentration is brought to a solids content of 56–57 percent or higher before it is formed into granules or pellets.

7. Process according to claim 1, in which the fluidisation and drying are effected with a stream of gas at a temperature of 50° – 400° C.

8. Process according to claim 7, in which the fluidization and drying are effected with a stream of gas at a temperature of 135° – 165° C.

9. Process according to claim 1, in which there is added to the product of the concentration step sufficient of a dried product similar thereto but of higher solids content to raise its solids content at least to the level at which formation of granules or pellets becomes possible.

10. Process according to claim 3, in which sufficient of the dried product is recycled and mixed with the product of the concentration step to raise its solids content at least to the level at which formation of granules or pellets becomes possible.

11. Process according to claim 1, in which the solids content of the product of the concentration step is increased by giving it a pre-drying treatment.

12. Process according to claim 11, in which the product of the concentration step is fragmented, and the fragments are pre-dried at a temperature of 50°– 400° C.

13. Process according to claim 12, in which the fragments are pre-dried by a fluidization technique.

14. Apparatus suitable for drying a culture of a micro-organism obtained as an aqueous suspension, comprising in combination a filter, a device for forming solid material from the filter into granules or pellets, means for drying said granules or pellets by a fluidization technique, and means for feeding the granules or pellets to the said drying means.

15. Apparatus according to claim 14, comprising also means for recycling a part of the material which has left the drying means and adding it to and mixing it with the solid material from the filter before it is granulated or pelleted.

* * * * *